United States Patent [19]
Buss

[11] 4,071,906
[45] Jan. 31, 1978

[54] CTD PROGRAMMABLE CONVOLVER

[75] Inventor: Dennis D. Buss, Richardson, Tex.

[73] Assignee: Texas Instruments Incorporated, Dallas, Tex.

[21] Appl. No.: 728,702

[22] Filed: Oct. 1, 1976

[51] Int. Cl.² .................... G06G 7/19; G11C 11/40
[52] U.S. Cl. .................... 364/819; 307/221 D; 333/70 T; 364/604; 364/726; 364/827; 364/862
[58] Field of Search .......... 235/152, 193, 181, 150.5; 307/221 D; 328/167; 333/18, 28 R, 70 T; 325/42, 65; 357/24

[56] References Cited
U.S. PATENT DOCUMENTS

| | | | |
|---|---|---|---|
| 3,819,958 | 6/1974 | Gosney | 307/221 D X |
| 3,935,439 | 1/1976 | Buss et al. | 235/181 |
| 3,940,602 | 2/1976 | Lagnado et al. | 235/181 |
| 3,942,035 | 3/1976 | Buss | 307/221 D |
| 3,952,188 | 4/1976 | Sloate et al. | 307/221 D X |

Primary Examiner—Joseph F. Ruggiero
Attorney, Agent, or Firm—James T. Comfort; Charles J. Fassbender

[57] ABSTRACT

Disclosed is a programmable convolver utilizing charge transfer devices. The convolver consists of a signal transform unit, a multiplier unit, and an inverse signal transform unit. The transform unit receives selected segments of successive samples of an input signal, and performs a chirp Z transform without post-multiplication on the samples. The multiplier unit forms product signals from the transformed samples and an arbitrary complex signal $H(kw_p)$. The inverse transform unit receives the product signals and performs an inverse chirp Z transform without pre-multiplication. Digital or analog transfer function generators may be included as part of the programmable convolver to generate the signal $H(kw_p)$.

45 Claims, 17 Drawing Figures

CTD PROGRAMMABLE CONVOLVER

BACKGROUND OF INVENTION

This invention relates to analog sampled data processing devices, and more particularly to charge transfer devices for performing programmable convolution operations and discrete Fourier transform operations on sampled analog signals. A programmable convolution operation is a convolution with an impulse response which is adjustable. Charge transfer devices include both charge coupled devices (CCDs) and bucket brigade device (BBDs).

The field of use for sampled data processing devices is very broad. Typical uses include processing of signals in radar systems, sonar systems, and communication systems.

In the past, sampled data processing devices were essentially confined to digital signal processors. Analog signals were converted to digital signals by an analog-to-digital converter, and a digital processor operated on the converter's output signals.

More recently, analog devices have been implemented which perform signal processing operations directly on analog signals. For example, U.S. Pat. No. 3,942,035 issued to Dennis Buss on Mar. 2, 1976 describes an invention which utilizes charge coupled devices (CCDs) to perform a chirp Z transform directly on sampled analog signals. As another example, co-pending application Ser. No. 554,884 by C. Hartmann, filed Mar. 3, 1975 describes an invention which utilizes surface wave devices to perform convolution operations directly on continuous analog signals.

Charge transfer signal processing devices offer significant advantages over digital signal processors. They have a smaller size and lesser weight. They also consume less power, and are less expensive.

However, the art of charge transfer signal processing is relatively new and undeveloped. For example, it is believed that no charge transfer device exists for performing a programmable convolution operation on an arbitrary input signal. In addition, no disclosure has been found which teaches the use of a read-only-memory, or a read/write memory, or a discrete Fourier transform unit to generate the adjustable impulse response of the programmable convolver.

Co-pending application by C. Hartmann describes an invention for performing convolution operations on analog signals, but many important differences exist between the invention herein described and the invention described in the co-pending application. For example, the latter utilizes surface wave devices; and their physical structure, principle of operation, and frequency range of operation are entirely different from charge transfer devices. In addition, the surface wave device operates on complex signals as a whole, rather than on real and imaginary components separately. And it also performs continuous transform and inverse transform operations, as opposed to discrete transform and inverse transform operations. These are substantial differences, for they grossly affect the structure of the invention, the speed of operation, and the result obtained.

U.S. Pat. No. 3,942,035 issued to Dennis Buss describes a charge transfer device for performing discrete Fourier transform operations. But it describes no apparatus for performing programmable convolution operations. In addition, the Buss patent does not describe any device for performing discrete Fourier transforms on input signals having both real and imaginary components. Nor does it suggest the use of charge transfer devices having dual impulse responses to reduce hardware.

Therefore, it is one object of the invention to provide a programmable convolver comprised of charge transfer devices.

It is another object of the invention to provide a programmable convolver having an impulse response which is stored in digital memory.

Another object of the invention is to provide a convolver having an impulse response which is generated by taking the discrete Fourier transform of the desired impulse response.

Another object of the invention is to provide a convolver comprised of charge transfer devices having dual impulse responses.

It is another object of the invention to provide a discrete Fourier transform unit that is capable of operating on complex input signals.

It is another object of the invention to provide a discrete Fourier transform unit comprised of dual impulse response charge transfer devices.

SUMMARY OF THE INVENTION

These and other objectives are accomplished in accordance with the invention by a signal transform unit, a multiplier unit, and an inverse signal transform unit. The signal transform unit receives selected segments of successive samples of an input signal, and performs a chirp Z transform without post-multiplication on the samples. A signal generator, a multiplier, and a filter are the primary components of the signal transform unit.

The multiplier unit forms product signals from the transformed samples and an arbitrary signal $H(kw_p)$. Digital or analog transform function generators may be included as part of the programmable convolver to generate the signal $H(kw_p)$.

The inverse signal transform unit receives the product signals and performs an inverse chirp Z transform without premultiplication. A signal generator, a multiplier, and a filter are the primary components of the inverse signal transform unit. Charge transfer devices, arranged as transversal filters, implement both of the above-described signal generators, and both of the above-described filters.

BRIEF DESCRIPTION OF DRAWINGS

The novel features believed to be characteristic of the invention are set forth in the appended claims; the invention itself, however, as well as other features and advantages thereof, may best be understood by referring to the following detailed description of particular embodiments when read in reference to the accompanying drawings, wherein:

DETAILED DESCRIPTION

Figure 1:
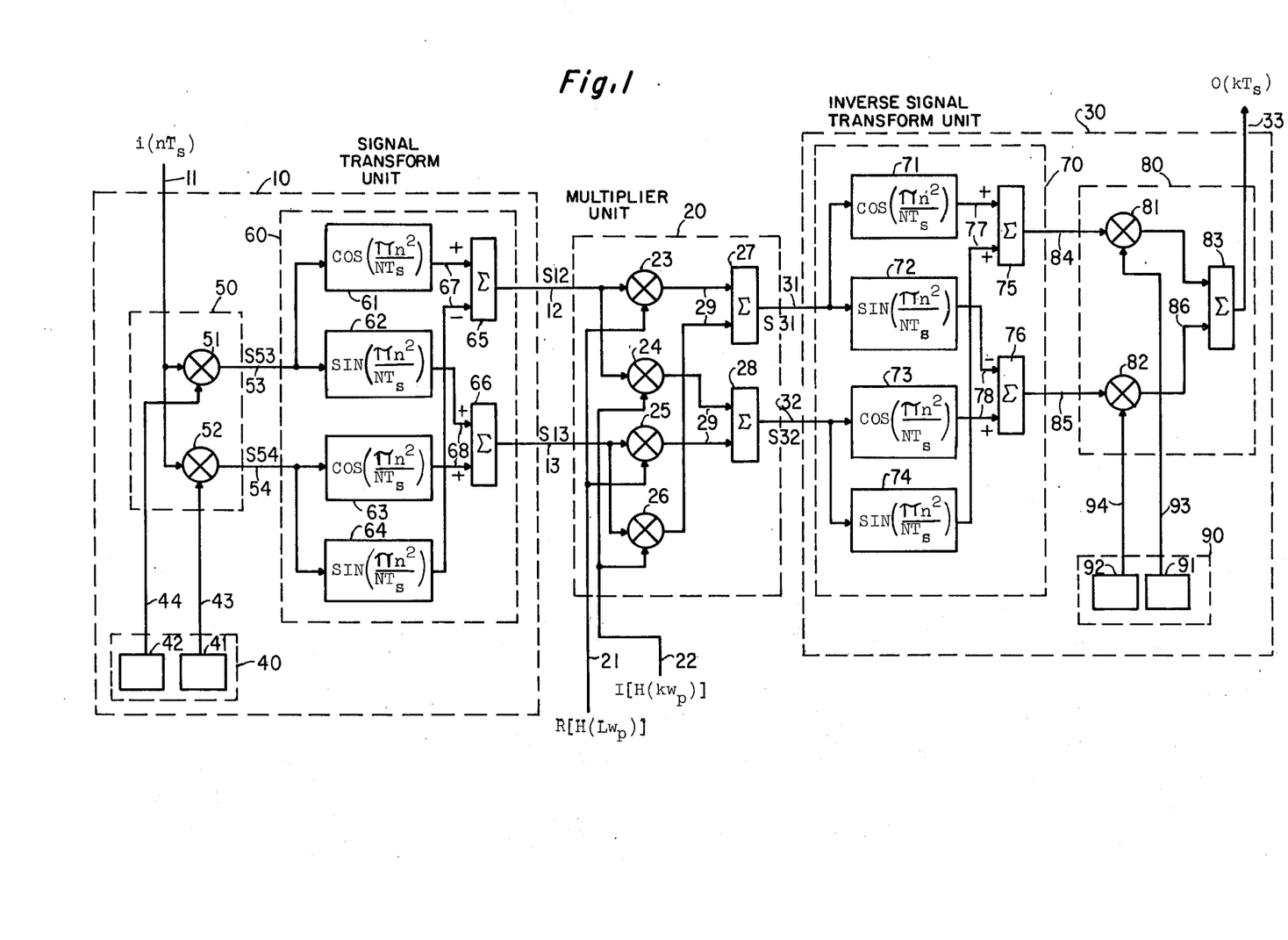
FIG. 1 is a block diagram of one embodiment of the programmable convolver.

Referring then to FIG. 1, a block diagram of one embodiment of the invention is illustrated. This embodiment is called a programmable convolver, and as the name implies, it performs an adjustable convolution operation. Basically, the programmable convolver is comprised of a signal transform unit 10, a multiplier unit 20, and an inverse signal transform unit 30.

The mathematical basis for the operation of the circuit in FIG. 1 is the principle that circular convolution in the time domain is multiplication in the frequency domain. Thus an N point circular convolution of two signals $i(nT_s)$ and $h(nT_s)$, which is defined as $$i(nT_s) * h(nT_s) = \sum_{K=O}^{n} i(kT_s)h(n-k)T_s + \sum_{k=n+1}^{n} 1(kT_s)h[(n-k+N)T_s],$$

can be performed by a circuit which directly implements the indicated summation. Alternatively, the operation $i(nT_s) * h(nT_s)$ may be performed by (1) generating a signal $I_m(kw_p)$ equal to a modified discrete Fourier transform of signal $i(nT_s)$, (2) generating a signal $H(kw_p)$ equal to the discrete Fourier transform of signal $h(nT_s)$, (3) forming the product $I_m(kw_p)H(kw_p)$, and (4) taking a modified inverse discrete Fourier transform of the product formed in step 3. The circuit of FIG. 1 implements this latter algorithm. The modified transform differs from the true transform by a phase factor $EXP[j\pi k^2/N]$.

Signal transform unit 10 has an input lead 11 for receiving N successive samples of selected segments of an electronic signal. These successive samples are designated as $i(nT_s)$ where $T_s$ is the time interval between the successive samples. Transform unit 10 also has a pair of output leads 12 and 13. Transform unit 10 generates signals S12 and S13 on leads 12 and 13 respectively. Signal S12 has a magnitude equal to the magnitude of the real component of the modified discrete Fourier transform of signal $i(nT_s)$. Similarly, signal S13 has a magnitude equal to the magnitude of the imaginary component of the modified discrete Fourier transform of signal $i(nT_s)$.

Multiplier unit 20 couples to leads 12 and 13 and receives the signals thereon. Multiplier unit 20 also has leads 21 and 22 for receiving a pair of signals representing an arbitrary complex signal $H(kw_p)$. Signal $R[h(kw_p)]$ is applied to lead 21 and has a magnitude equal to the magnitude of the real component of $H(kw_p)$. Similarly, signal $I[H(kw_p)]$ is applied to lead 22 and has a magnitude equal to the magnitude of the imaginary component of $H(kw_p)$. Multiplier unit 20 generates a pair of product signals on leads 31 and 32. Signal S31 on lead 31 equals the real component of the complex product of the complex signals on leads 12, 13, 21 and 22. Similarly, signal S32 on lead 32 equals the imaginary component of the complex product of the complex signals on leads 12, 13, 21, and 22.

Inverse signal transform unit 30 couples to leads 31, and 32, and receives the signals thereon. Inverse transform unit 30 performs a modified inverse discrete Fourier transform of the signals on leads 31 and 32; and generates a signal $o(kT)$ on a lead 33 equal to $i(nT_s) * h(nT_s)$.

Convolution performed in the above manner is programmable because the signal $H(kw_p)$ is arbitrary, and thus can be adjusted to make the circuit of FIG. 1 behave in any manner described. For example, if signal $H(kw_p)$ equals the discrete Fourier transform of the impulse response $h(nT_s)$ of a particular filter, then the circuit of FIG. 1 produces output signals identical to signals produced by the particular filter. In other words, the impulse response $h(nT_s)$ of the circuit of FIG. 1 is determined by the signal $H(kw_p)$; and signal $H(kw_p)$ can be anything.

The detailed construction and theory of operation of units 10, 20, and 30 will now be described beginning with a description of signal transform unit 10. Basically, signal transform unit 10 consists of a pre-DFT generator 40, a pre-DFT multiplier 50, and a DFT filter 60. Pre-DFT generator 40 consists of two sinusoidal generators 41 and 42. Generator 41 generates a signal equal to $-\sin(\pi n^2/N)$ on a lead 43; and generator 42 generates a signal equal to $+\cos(\pi n^2/N)$ on a lead 44.

Pre-DFT multiplier unit 50 is comprised of two multipliers 51 and 52. Multiplier 51 has two input leads 11 and 44, and one output lead 53. A signal S53 is generated on lead 53 by multiplier 51. Signal S53 equals the product of the signals on leads 11 and 44. Similarly, multiplier 52 has two input leads 11 and 43, and one output lead 54. A signal S54 is generated on lead 54. Signal S54 equals the product of the signals on leads 11 and 43.

DFT filter 60 is comprised of two sine-convolvers 62 and 64, two cosine convolvers 61 and 63, and two summers 65 and 66. Convolvers 62 and 64 have a fixed impulse response of $\sin(\pi n^2/N)$, while convolvers 61 and 63 have a fixed impulse response of $\cos(\pi n^2/N)$. Convolvers 61 and 62 couple to lead 53 and are receptive of the signals thereon. Similarly, convolvers 63 and 64 couple to lead 54 and are receptive of the signals thereon. The outputs of convolvers 61 and 64 are coupled to the inputs of summer 65 via leads 67; and the output of summer 67 couples to lead 12. Thus signal S12 on lead 12 equals $$-i(nT_s)\cos(\pi n^2/NT_s)*\cos(\pi n^2/NT_s) + i(nT_s)\sin(\pi n^2/NT_s)*\sin(\pi n^2/NT_s).$$

Similarly, the outputs of convolvers 62 and 63 are coupled to the inputs of summer 68 via leads 68; and the output of summer 68 couples to lead 13, thus signals S13 on lead 13 equals $+ i(nT_s)\cos(\pi n^2/NT_s) \star \sin(\pi n^2/NT_s) - i(nT_s)\sin(\pi n^2/NT_s) \star \cos(\pi n^2/NT_s).$ The reason signals S12 and S13 have magnitudes equal to the real and imaginary components of a modified discrete Fourier transform of signal $i(nT_s)$ becomes evident by considering the mathematical expression for the discrete Fourier transform; and the identity $2nk = n^2 + k^2 - (n-k)^2$. The discrete Fourier transform $I(kw_p)$ of a signal $i(nT_s)$ is defined as $$I(kw_p) = \sum_{n=0}^{N-1} i(nT_s)\text{EXP}(-j2\pi nk/N).$$

Substitution of the above identity into $I(kw_p)$ yields $$I(kw_p) = [\text{EXP} - j\pi k^2/N] \sum_{n=0}^{N-1} i(nT_s)[\text{EXP} - j\pi n^2/N][\text{EXP}j\pi(k-n)^2/N].$$

This expression contains the term $T_1 = \text{EXP}[-j\pi k^2/N]$ and the term $$T_2 = \sum_{n=0}^{N-1} i(nT_s)[\text{EXP} - j\pi n^2/N][\text{EXP}j\pi(k-n)^2/N].$$

Comparing $T_2$ to the definition of discrete convolution shows that $T_2$ is the convolution of $i(nT_s)\text{EXP}[-j\pi n^2/N]$ and $\exp(j\pi n^2/N)$. Therefore $T_2$ can be re-written as $T_2 = i(nT_s)\text{EXP}[-j\pi n^2/N] \star \text{EXP}[j\pi n^2/N]$. Physically, the convolution of any two signals $x_1(nT_s)$ and $x_2(nT_s)$ is implemented by sending signal $x_1(nT_s)$ through a circuit whose impulse response is $x_2(nT_s)$. Therefore $T_2$ is implemented by sending signal $i(nT_s)\text{EXP}[-j\pi n^2/N]$ through a circuit whose impulse response to $\text{EXP}[j\pi n^2/N]$.

The entire expression for $I(kw_p)$ therefore is obtained by a sequence of three steps. First, multiply $i(nT_s)$ by $\text{EXP}[-j\pi n^2/N]$. Second, send the product $i(nT_s)\text{EXP}(-j\pi n^2/N)$ through a circuit having an impulse response of $\text{EXP}(j\pi n^2/N)$. And third, multiply the result of step 2 by $\text{EXP}[-j\pi k^2/N]$. This algorithm is called the Chirp Z transform.

Transform unit 10 performs steps 1 and 2, but does not perform post-chirp multiplication by $\text{EXP}[-j\pi n^2/N]$. Thus, the modified discrete Fourier transform implemented by unit 10 is a chirp Z transform without post-chirp multiplication.

Consideration of the identity $\text{EXP}[j\theta] = \cos(\theta) + j\sin\theta$ helps explain how transform unit 10 performs the above steps 1 and 2. This identify shows that step 1 can be re-defined to be: multipy $i(nT_s)$ by $\cos(\pi n^2/N)$ $j\sin(\pi n^2/N)$. Inspection of FIG. 1 shows that pre-DFT generator 40 and pre-DFT multiplier 50 perform this re-defined step. Generator 40 and multiplier 50 imply the $j$ operator by acting on real and imaginary components of complex signals separately. Thus, the signals on leads 44 and 52 represent the real component of complex signals; and the signals on leads 43 and 54 represent the imaginary component of complex signals.

Similarly, step 2 can be re-defined as — send the product of step 1 through a convolver having an impulse response of $\cos(\pi n^2/N) + j\sin(\pi n^2/N)$. DFT filter 60 performs this operation. Again, the $j$ operator is implied by acting on the real and imaginary components separately. Thus signal S12 represents the real component of the modified transform of $i(nT_s)$, and signal S13 represents the imaginary component.

What remains to be done with transform unit 10 is to implement each of the components with physical devices. Several of the components perform complicated mathematical operations — as described above. However, they are readily implemented using charge transfer devices. For example, elements 41, 42, 61, 62, 63 and 64 are each implemented with one charge transfer device. However, the discussion of how this is possible will be postponed until after the following discussion on the detailed construction and theory of operation of units 20 and 30.

Multiplier 20 is comprised of four multipliers 23, 24, 25, and 26; and two summers 27 and 28. These elements are interconnected to receive complex signals on leads 12, 13, 21, and 22; and form their complex product on leads 31 and 32.

The real part of the complex product is produced by multipliers 23 and 26, and by adder 27. Multiplier 23 operates on the signals on leads 12 and 21 — both of which are real signals. Multiplier 26 operates on the signals on leads 13 and 22 — both of which are imaginary signals. The product terms formed by multipliers 23 and 26 are both real. They are generated on leads 29 and are added by adder 27. The resulting signal is generated on lead 31.

The imaginary component of the complex product is produced by multipliers 24 and 25; and by adder 28. Multiplier 24 operates on the signals on leads 12 and 22 — which are real and imaginary respectively. Multiplier 25 operates on the signals on leads 13 and 21 — which are imaginary and real respectively. The product terms generated by multipliers 24 and 25 are therefore both imaginary. They are generated on leads 29 and added by adder 28. The resulting signal is generated on lead 32.

Inverse signal transform unit 30 consists of an IDFT filter unit 70, a post-IDFT generator unit 90, and a Post-IDFT multiplier unit 80. IDFT filter unit 70 is comprised of two cosine convolvers 71 and 73, two sine convolvers 72 and 74, and two summers 75 and 76. Convolvers 71 and 73 have an impulse response of $\cos(\pi n^2/N)$, while convolvers 72 and 74 have an impulse response of $\sin(\pi n^2/N)$. Convolvers 71 and 72 have an input coupled to lead 31, and thus perform convolution on signal S31. Similarly, convolvers 73 and 74 have an input coupled to lead 32, and thus perform convolution on signal S32. Summer 75 has inputs coupled via leads 77 to the output of convolvers 71 and 74; and has an output coupled to lead 84. Signal S84 on lead 84 thus equals $S31 \star \cos(\pi n^2/N) + S32 \star \sin(\pi n^2/N)$. Summer 76 has inputs coupled via leads 78 to the output of convolvers 72 and 73; and has an output coupled to lead 85. Signal S85 on lead 85 thus equals — $S31 \star \sin(\pi n^2/N) + S32 \star \cos(\pi n^2/N)$.

Post-IDFT generator 90 consists of two sinusoidal generators 91 and 92. Generator 91 produces a signal equal to $+\sin(\pi n^2/N)$ on a lead 93, while generator 92 produces a signal equal to $+\cos(\pi n^2/N)$ on a lead 94.

Post-IDFT multiplier unit 80 is comprised of two multipliers 81 and 82, and one summer 83. Mutliplier 81 has inputs coupled to leads 84 and 93, and multiplies the signals thereon. Multiplier 82 has inputs coupled to leads 85 and 94 and multiplies the signals thereon. Summer 83 has inputs coupled via leads 86 to the output of multipliers 81 and 82. The output of summer 83 couples to lead 33.

The fact that this configuration of inverse transform unit 30 actually performs a modified inverse discrete Fourier transform of the signals on leads 31 and 32 will now be established. The inverse discrete Fourier transform of the signal $I(kw_p)H(kw_p)$ is defined to be $$\text{IDFT}\,[I(kw_p)H(kw_p)] = \sum_{n=0}^{N-1} I(kw_p)H(kw_p)\text{EXP}[j^2\pi kn/N].$$

Substituting the identity $2nk \equiv n^2 + k^2 - (n-k)^2$ into this expression yields $$[\text{EXP}j\pi n^2/N]\sum_{n=0}^{N-1} I(kw_p)H(kw_p)\,\text{EXP}[+j\pi k^2/N]\,\text{EXP}[-j(k-n)^2/N].$$

This expression contains the term $T_3 = I(kw_p)\cdot[\text{EXP}+j\pi k^2/N]$, and it was previously shown that $I(kw_p)$ is defined by a three-step operation. The third step was multiplication by a term $T_4 = \text{EXP}[-j\pi k^2/N]$. Comparison of the terms $T_3$ and $T_4$ shows that the multiplication by $T_4$ and the multiplication indicated in term $T_3$ cancel each other and therefore are unnecessary. For this reason, the third step is not performed by transform unit 10, and multiplication by $\text{EXP}[+j\pi k^2/N]$ is not performed by inverse transform unit 30.

Inverse transform unit 30 therefore must form the expression $$\text{EXP}[j\pi n^2/N]\sum_{n=0}^{N-1} I_m(kw_p)H(kw_p)\,\text{EXP}[-j\pi(k-n)^2/N]$$

where $I_m(kw_p)$ is the modified transform of $i(nT)$ and $I_m(kw_p)H(kw_p)$ is the output of multiplier unit 20. IDFT filter 70 forms the terms $$\sum_{n=0}^{N-1} I_m(kw_p)H(kw_p)\,\text{EXP}[-j\pi(k-n)^2/N].$$

This term is identical to the convolution of $I_m(kw_p)H(kw_p)$ with $\text{EXP}(-j\pi k^2/N)$, and IDFT filter 70 has an impulse response of $\text{EXP}(-j\pi k^2/N)$. The identity $\text{EXP}(j\theta) = \cos\theta + j\sin\theta$ permits the $\text{EXP}(-j\pi k^2/N)$ to be re-written as $\cos(\pi k^2/N) - j\sin(\pi k^2/N)$. This last expression clearly indicates the structure of IDFT filter 70. Convolvers 71 and 72 perform the required convolution of the real part of $I_m(kw_p)H(kw_p)$; while convolvers 73 and 74 perform the required convolution on the imaginary part.

Post-IDFT generator 90 forms the term $\text{EXP}(j\pi n^2/N)$, and post-IDFT multiplier 80 forms the product of $\text{EXP}(j\pi n^2/N)$ and $$\sum_{n=0}^{N-1} I_m(kw_p)H(kw_p)[\text{EXP}\,-j\pi(k-n)^2/N].$$

The result, on lead 33, therefore equals $i(nT_s) * h(nT_s)$. THe problem that remains is to implement each of the functions indicated in FIG. 1 with physical components. The structure of these physical components will now be described.

Figure 2:
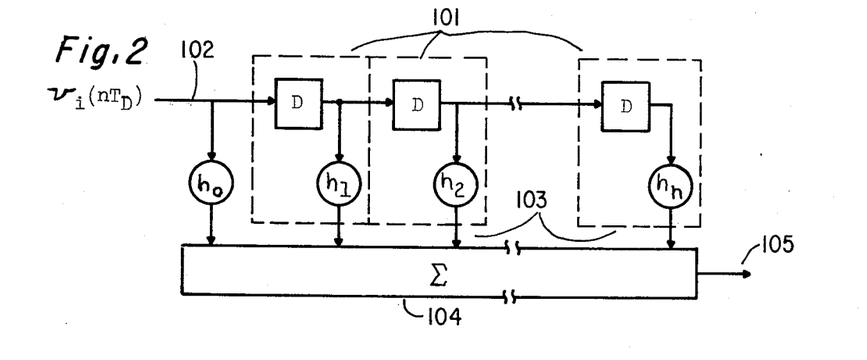
FIG. 2 is a block diagram of a charge transfer device arranged as a transversal filter.

Referring to FIG. 2, a block diagram of a CCD, arranged as a transversal filter is illustrated. The CCD is comprised, basically, of a serial array of several analog voltage delay stages 101. The first stage receives an input signal $v_i(nT_D)$ on a lead 102. Each stage feeds the next stage in series, and each stage also has a weighted output lead 103. Leads 103 connect to a summer 104. The result of summer 104 is a signal $v_o(nT_D)$ on a lead 105. Additional input or output diodes may exist but are not shown.

The impulse response $h(nT)$ of the CCD in FIG. 2 is easily obtained by applying an impulse to the input, and by calculating the resulting output signal $v_o(nT_D)$. If $v_n(0) = 1$ and $v_n(nTs) = 0$ for $n \neq 0$, then it is apparent that $v_o(nT_D)$ equals $h_0, h_1, h_2 \ldots$ for $n = 0, 1, 2 \ldots N-1$.

The above relation indiates how to physically implement convolvers 61, 62, 63 and 64 in pre-DFT filter 60. The impulse response of convolver 61, for example, is $\cos(\pi n^2/N)$. This is implemented using the circuit of FIG. 2 and by setting $h_n = \cos(\pi n^2/N)$ for $n = 0, \ldots 2N-1$. Similarly, convolver 62 has an impulse response of $\sin(\pi n^2/N)$. It therefore is implemented using the circuit of FIG. 2 and by setting $h_n = \sin(\pi n^2/N)$ for $n = 0, \ldots 2N-1$.

In a similar manner, pre-DFT generator 40 is also implemented using CCDs. This is possible because the convolution of a unit impulse $\delta(nTs)$ and a circuit having an impulse response $h(nTs)$ is $h(nTs)$. Therefore, to obtain the signal $+\cos(\pi n^2/N)$, it is only necessary to construct a transversal filter using CCDs having an impulse response of $+\cos(\pi n^2/N)$ and to feed a unit impulse into the filter.

The majority of the circuit of FIG. 1 can therefore be implemented using a total of twelve CCDs. This would include every component except the multipliers and summers; and they can be built by conventional methods. For example, IGFET technology is compatible with CCD technology and may be used.

Figure 3A:
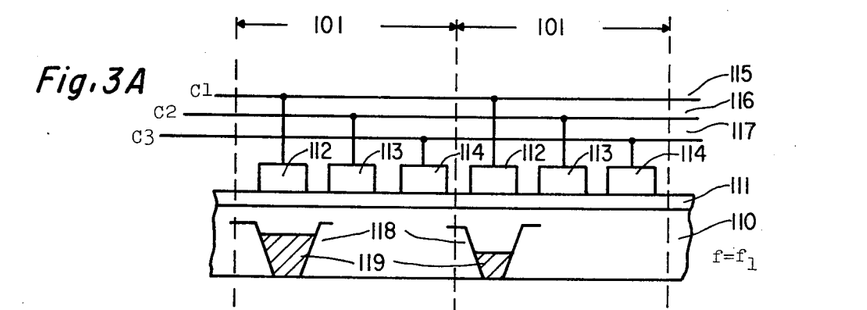
FIGS. 3a – 3d are greatly enlarged cross-sectional views of two adjacent stages within the transversal filter of FIG. 2.

A more detailed description of one type of CCD (known as a 3-phase n-channel CCD) is illustrated in FIGS. 3a to 3e. FIG. 3a, for example, illustrates a cross-sectional view of two adjacent analog delay stages within this type CCD. Basically, each stage 101 is comprised of a common semiconductor substrate 110, a common insulating material 111, a set of three electrodes 112, 113, 114, and three common clock leads 115, 116, 117 which interconnect the three electrodes of each stage.

Signal $v_i(kT_s)$ of each stage 101 is carried by packets of minority charge carriers 119 within substrate 110. These packets 119 are trapped by potential wells 118 within each stage. Potential wells 118 are formed under electrodes 112, 113, or 114 by applying a voltage of proper polarity to leads 115, 116 or 117 respectively. The proper polarity is one which will attract the minority charge carriers. For example, if substrate 110 is p-type silicon, the minority charge carriers are electrons, and thus a potential well is formed by applying a positive voltage to leads 115, 116 or 117.

Figure 3B:
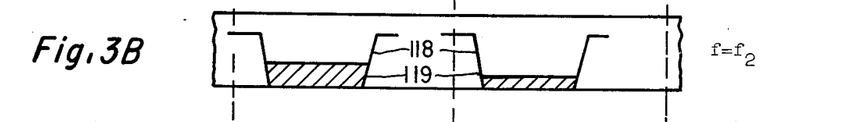
Figure 3C:
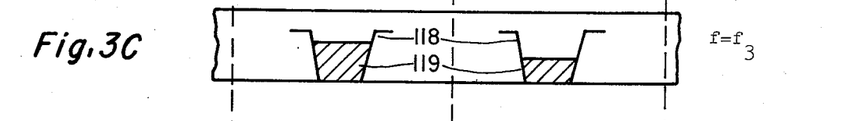
Figure 3D:
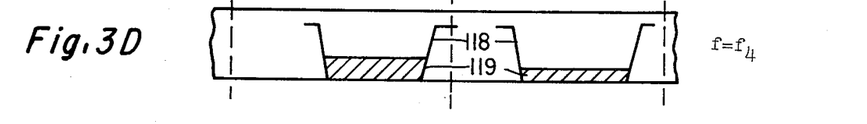
Figure 3E:
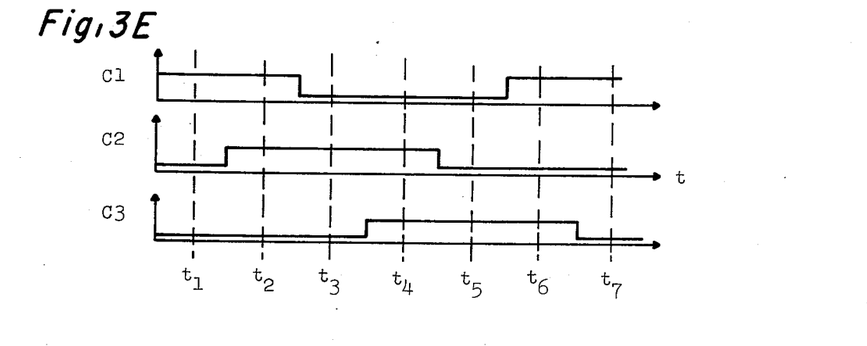
FIG. 3e is a timing diagram illustrating a clock sequence for moving charge within the transversal filter of FIG. 2.

Charge packets 119 are moved from stage to stage by properly sequencing the voltage on leads 115, 116 and 117. FIGS. 3a - 3e illustrate this charge transfer mechanism. At a time $t_1$ clock C1 on lead 115 is at a high voltage while clock C2 on lead 116 and clock C3 on lead 117 are near ground. Thus, a potential well is only formed under electrodes 112 of each stage as illustrated in FIG. 3a. At a time $t_2$, clocks C1 and C2 both are at a high voltage while clock C3 remains at ground. Thus a potential well is formed under electrodes 112 and 113; and the charge packets 119 are distributed under these electrodes as illustrated in FIG. 3b. At a time $t_3$, clock C2 has a high voltage while clocks C1 and C3 are at ground. Thus a potential well is formed only under electrodes 113; and thus charge packets 119 exist only under electrodes 113. This sequence can be continued, as indicated by time instants $t_1 - t_7$, until the charge packet under electrode 112 of one stage 101 has moved under electrode 112 of the adjacent stage. The time interval in which sequence $t_1 - t_7$ occurs is the time delay $T_s$ of each stage.

Figure 4:
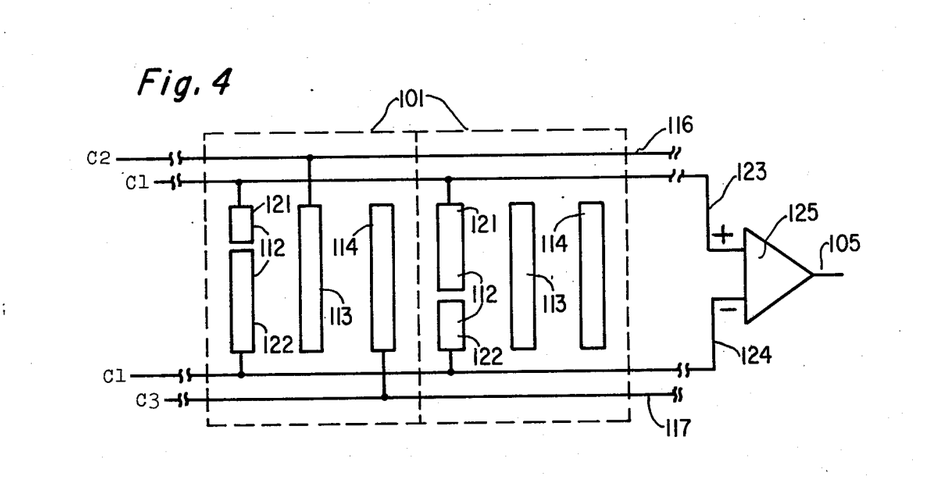
FIG. 4 is a schematic diagram of two adjacent stages of a split electrode charge transfer device.

Referring to FIG. 4, one implementation of weighted output leads 103 and summer 104 is illustrated. This implementation is called a split electrode CCD. In the split electrode CCD, one electrode of each stage 101 is split into partial electrodes. FIG. 4 illustrates a top view of a CCD in which electrode 112 is split into partial electrodes 121 and 122, and clock lead 115 is split into leads 123 and 124.

The principle of operation of the split electrode CCD is that as a charge packet 119 transfers within substrate 110 under an electrode, a proportional but opposite charge must flow into the electrode from the clock line. Therefore, since the charge packets 119 are nearly evenly distributed under partial electrodes 121 and 122, the amount of charge which flows into each one is proportional to the area of the partial electrode.

Figure 5:
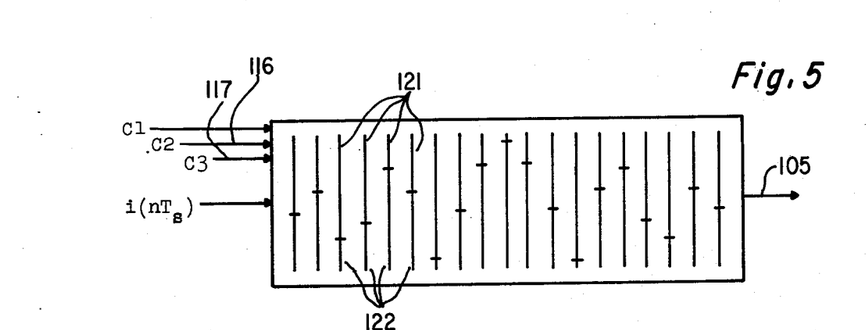
FIG. 5 is a top view schematic of a split electrode transversal filter.

Positive and negative weights are obtained by letting the charge in partial electrode 121 represent a positive value, by letting the charge in partial electrode 122 represent a negative value, and by subtracting the two values by a subtractor 125. For example, to obtain a value of $h_m = +1$, the split in the $m^{th}$ stage should occur so all the charge flows into partial electrode 121. To obtain a value of $h_m = -1$, the split in the $m^{th}$ stage should occur so all the charge flows into partial electrode 122. And to obtain a value of $h_m = 0$, the split in the $m^{th}$ stage should occur so an equal amount of charge flows into partial electrodes 121 and 122. Values of $h_m$ between $+1$ and $-1$ are limited only by the accuracy of placement of the split. FIG. 5 illustrates a top view of a split electrode CCD in which the splits are arranged to obtain an impulse response of $\sin(nw_pT_s)/nw_pT_s$.

Figure 6:
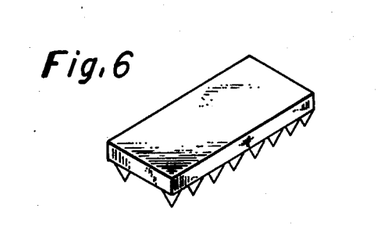
FIG. 6 is a pictorial view of one physical embodiment of the programmable convolver.

Using present integrated circuit technology, the entire circuit of FIG. 1 with N=32 is capable of being implemented on two semiconductor chips. FIG. 6 illustrates a chip of 200 mils by 200 mils on which the circuit of FIG. 1 may be fabricated. Leads 131 are provided for input signal $i(nTs)$; output signal $o(nTs)$; clocks C1, C2, C3; and supply voltages.

Figure 7:
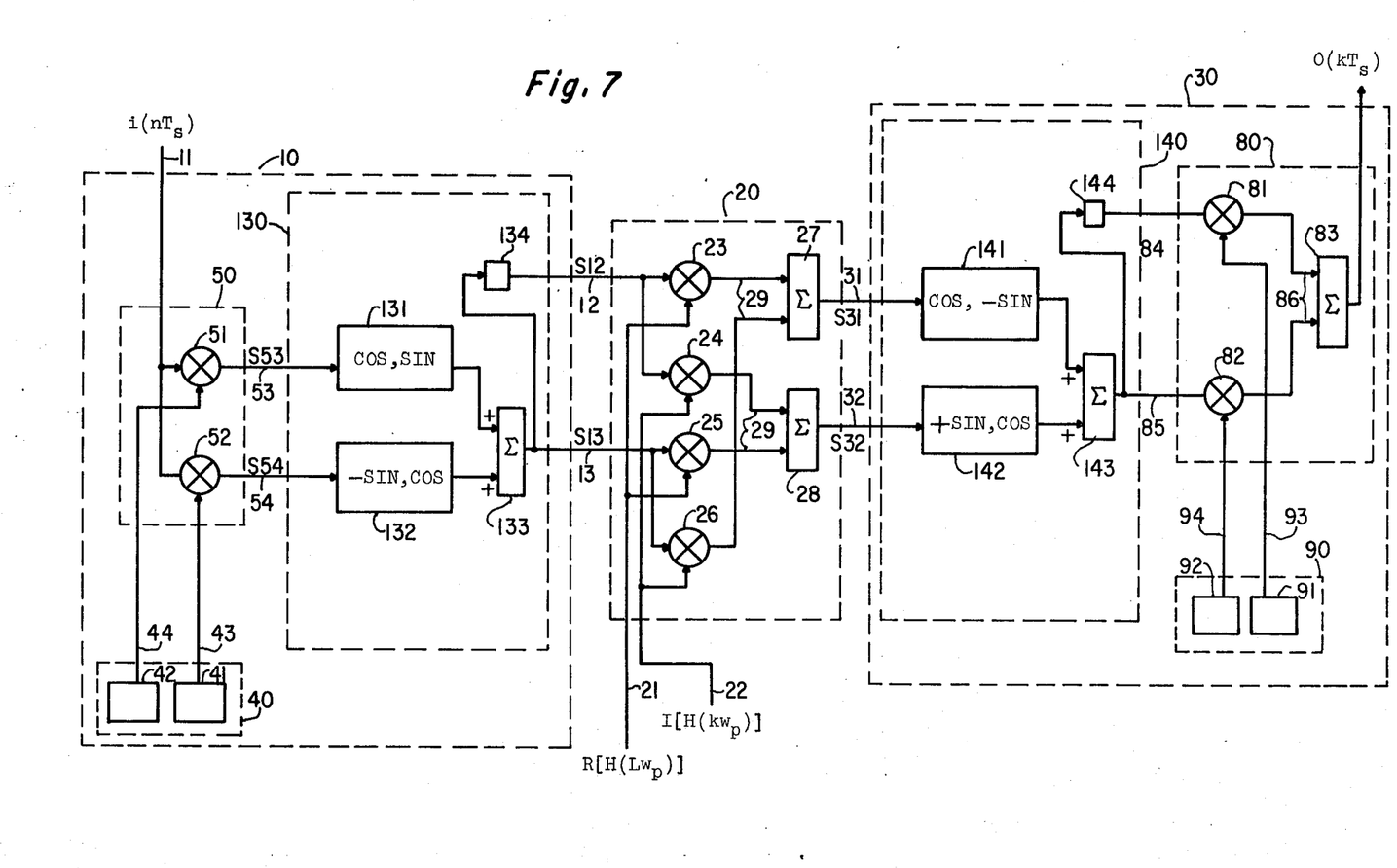
FIG. 7 is a block diagram of an embodiment of the programmable convolver which utilizes dual impulse response convolvers.

Referring to FIG. 7, another embodiment of the invention is illustrated. This embodiment is similar to the embodiment of FIG. 1. The primary difference is that DFT filter 130 and IDFT filter 140 are implemented with dual impulse response convolvers.

DFT filter 130 is comprised of dual impulse convolvers 131 and 132. Convolver 131 has sequential impulse responses of $\cos(\pi n^2/N)$ and $\sin(\pi n^2/N)$, while convolver 132 has sequential impulse responses of $-\sin(\pi n^2/N)$ and $\cos(\pi n^2/N)$.

At a time $t_1$, the impulse response of convolvers 131 and 132 are respectively $\cos(\pi n^2/N)$ and $-\sin(\pi n^2/N)$. The input of convolver 131 and 132 are respectively $i(nTs)\cos(\pi n^2/N)$ and $-i(nTs)\sin(\pi n^2/N)$. The input of convolver 131 couples to lead 53, and the input of convolver 132 couples to lead 54. An adder 133 sums the output of convolvers 131 and 132, and places the result on lead 13. Therefore, signal S13 on lead 13 equals the real component of the modified discrete Fourier transform of $i(nT_s)$. Lead 13 couples to the input of a hold circuit 134 and at time $t_1$ signal S13 is stored in hold circuit 134. The output of hold circuit 134 couples to lead 12.

At a time $t_2$, the impulse response of convolvers 131 and 132 are respectively $\sin(\pi n^2/N)$ and $\cos(\pi n^2/N)$. Therefore, signal S13 on lead 13 equals the imaginary component of the modified discrete Fourier transform of $i(nT_s)$. Thus, at time $t_2$, signals S12 and S13 on leads 12 and 13 equal the real and imaginary components of the modified discrete Fourier transform of $i(nT_s)$.

Similarly, IDFT filter 140 is comprised of dual impulse convolvers 141 and 142. Convolver 141 has sequential impulse responses of $\cos(\pi n^2/N)$ and $-\sin(\pi n^2/N)$, while convolver 142 has sequential impulse responses of $+\sin(\pi n^2/N)$ and $\cos(\pi n^2/N)$. At a time $t_3$, the impulse response of convolvers 131 and 132 are respectively $\cos(\pi n^2/N)$ and $+\sin(\pi n^2/N)$. The input of convolver 141 couples to lead 31, and the input of convolver 142 couples to lead 32. Adder 143 sums the output of convolvers 141 and 142, and places the result in hold circuit 144. The output of hold circuit 144 couples to lead 84, and the input of hold circuit 144 couples to lead 85. At time $t_3$, the output signal of adder 143 is stored in hold circuit 144. At time $t_4$, the impulse response of convolvers 141 and 142 change to their other value, and thus the signals on leads 84 and 85 equal the real and imaginary component of the desired result.

Figure 8:
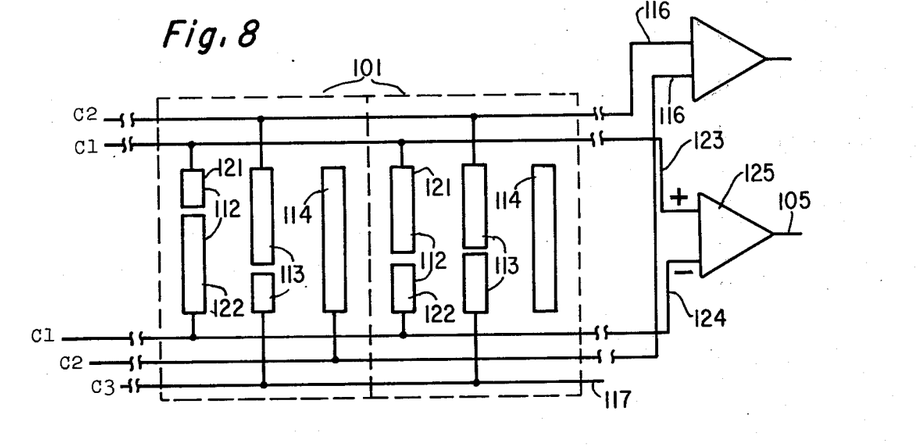
FIG. 8 is a schematic diagram of two adjacent stages of a dual impulse response charge transfer device.

The manner in which two sequential impulse responses are obtained from one CCD convolver becomes evident by referring to FIGS. 4 and 8. Referring to FIG. 4, each stage 101 in the CCD contains three electrodes 112, 113, and 114. Electrode 112 is split, and thus serves the dual purpose of creating potential wells to move charge packets, and creating voltage differences in each partial electrode to implement $h_m$. Electrodes 113 and 114 are not split, and thus are used only to create potential wells. However, electrodes 113 may also be split in a manner to implement another transfer function. This structure is used to implement the sequential convolvers in FIG. 7. As the charge packets pass under electrodes 112 in FIG. 7, one impulse response in activated; and as the charge packets pass under electrodes 113, a second impulse response is activated. The remaining components are implemented by previously described hardware.

Signals $R[h(kw_p)]$ and $I[(kw_p)]$ in FIGS. 1 and 7 represent the transfer function of the programmable convolver and are generated in any one of several ways. In one embodiment of the invention, digital logic is used to implement the signals. For example, FIGS. 9a and 9b illustrate block diagrams of two digital transfer function generators.

Figure 9A:
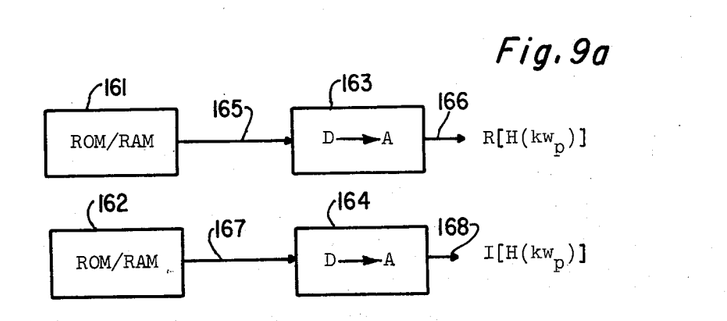
FIG. 9a is a block diagram of a parallel output digital transfer function generator.
Figure 9B:
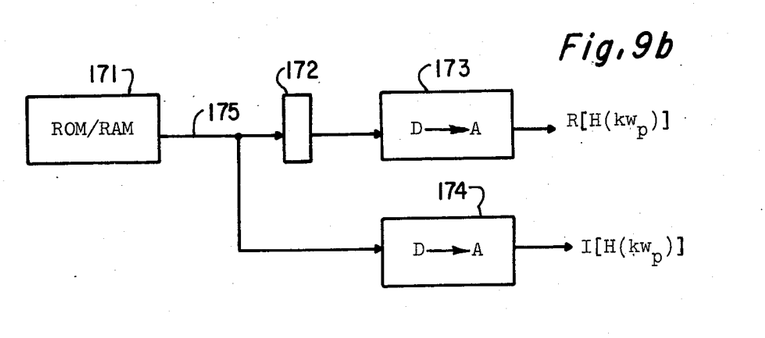
FIG. 9b is a block diagram of a serial output transfer function generator.

The digital transfer function generator of FIG. 9a is comprised of a pair of memories 161 and 162; and a pair of digital to analog converters 163 and 164. The memories are either a read-only type (ROM), or a read-write type (RAM).

Memory 161 has a plurality of output leads 165 which couple to the input of D/A converter 163. Signals on leads 165 represent the digital value of $R[H(kw_p)]$, and the signal on lead 166 represents the analog value of $R[H(kw_p)]$.

Similarly, memory 162 has a plurality of output leads 167 which couple to the input D/A converter 164. Signals on leads 167 represent the digital value of $I[H(kw_p)]$, and the signal on lead 168 represents the analog value of $I[H(kw_p)]$.

The digital transfer function generator of FIG. 9b is comprised of a single memory 171, a digital holding register 172, and a pair of digital to analog converters 173 and 174. Memory 171 is either a ROM or a RAM, and is sequentially addressed to provide the digital values of $R[H(kw_p)]$ and $I[H(kw_p)]$ on leads 175.

At a time $t_1$, memory 171 is addressed to provide the digital value of $R[H(kw_p)]$ on leads 175. This value is stored in register 172. The output of register 172 couples to the input of D/A converter 173, and thus D/A converter 173 produces the analog value of $R[H(kw_p)]$.

At a time $t_2$ subsequent to $t_1$, memory 171 is addressed to provide the digital value of $I[H(kw_p)]$ on leads 175. This value passes through D/A converter 174, and thus D/A converter 174 produces the analog value of $I[H(kw_p)]$.

The hardware of the transfer function generators of FIGS. 9a and 9b is reduced substantially for certain types of transfer functions. If the impulse response $h(nT_s)$ is a real function, then $R[H(kw_p)]$ is symmetric and $I[H(kw_p)]$ is asymmetric. Therefore only half of the values of $R[H(kw_p)]$ and $I[H(kw_p)]$ are stored in memories 161, 162, and 171. If $h(nT_s)$ is a real and symmetric function, then $I[H(kw_p)]$ is zero. Therefore elements 162, 164, 167, 168 and 174 are eliminated. Similarly, if $h(nT_s)$ is real and asymmetric, then $R[H(kw_p)]$ is zero. Therefore elements 161, 163, 165, 166, 172, and 173 are eliminated.

For example, in a Hibert transform, $R[H(kw_p)]$ is zero, while $I[H(kw_p)]$ is $-1$ for $k$ less than zero and $+1$ for $k$ greater than zero. As another example, in a single sideband transform, $R[H(kw_p)]$ is zero, while $I[H(kw_p)]$ is 0 for $k$ less than zero and $+1$ for $k$ greater than zero.

Figure 10:
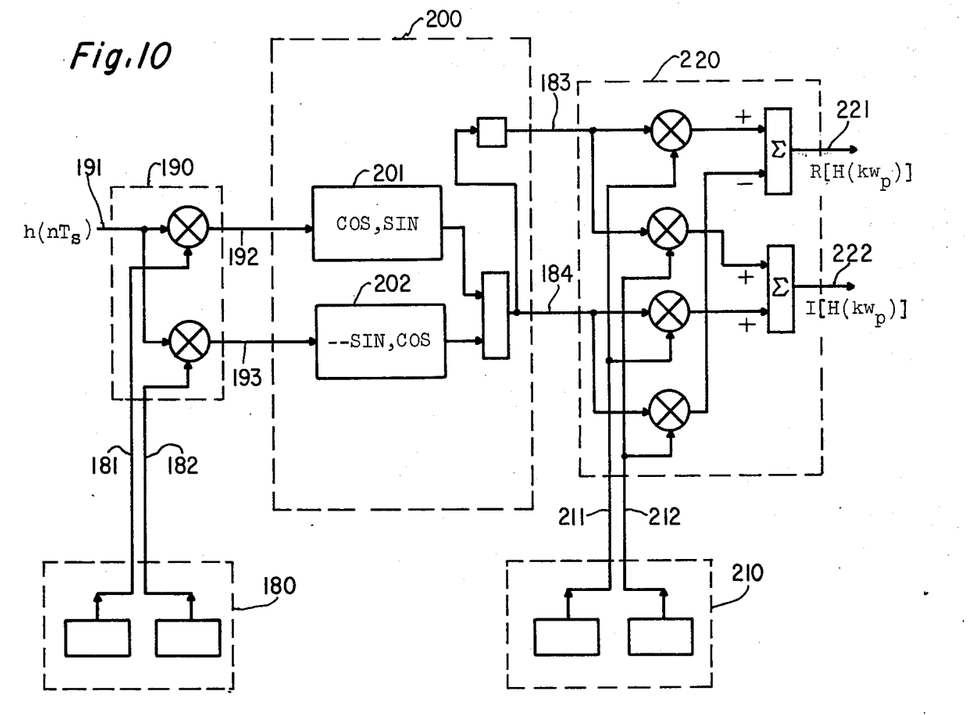
FIG. 10 is a block diagram of an analog transfer function generator utilizing charge transfer devices.

In another embodiment of the invention, analog hardware is used to generate the signals $R[H(kw_p)]$ and $I[H(kw_p)]$. For example, a discrete Fourier transform unit as illustrated in FIG. 10 is used. The unit of FIG. 10 receives a signal $h(nT_s)$ on a lead 191, and in response generates signals $R[H(kw_p)]$ and $I[H(kw_p)]$ on leads 221 and 222 respectively.

Basically, the transform unit consists of a pre-DFT generator 180, a pre-DFT multiplier 190, a DFT filter 200, a post DFT generator 210, and a post-DFT multiplier 220. These components interact to perform the previously described three step algorithm for computing a discrete Fourier transform.

Generator 180 generates signals $+\cos(\pi n^2/N)$ and $-\sin(\pi n^2/N)$ on leads 181 and 182 respectively. Multiplier 190 has inputs coupled to leads 181, 182, and 191; and forms product signals on leads 192 and 193. Filter 200 is comprised of two dual impulse response convolvers 201 and 202. Convolver 201 has sequential impulse responses of $\cos(\pi n^2/N)$ and $\sin(\pi n^2/N)$, while convolver 202 has sequential impulse responses of $-\sin(\pi n^2/N)$, $+\cos(\pi n^2/N)$. The result of the first sequential convolution operation is formed on lead 183, and the result of the second sequential convolution is formed on lead 184. Generator 210 generates signals $+\cos(\pi n^2/N)$ and $-\sin(\pi n^2/N)$ on leads 211 and 212 respectively. Multiplier 220 forms the product of the complex signals on leads 183, 184, 211, and 221 on leads 221 and 222. Each of the components in the discrete Fourier transform unit of 10 is capable of being implemented with CCD devices as previously described.

The circuit of FIG. 10 may be utilized with the programmable convolvers of FIGS. 1 or 7 to perform filtering and correlations. If $h(nT_s)$ is the impulse response of a particular filter, then the programmable convolver performs a filtering operation. And if the signal $h(nT_s)$ is a reference signal, then the programmable convolver performs a correlation operation.

Figure 11:
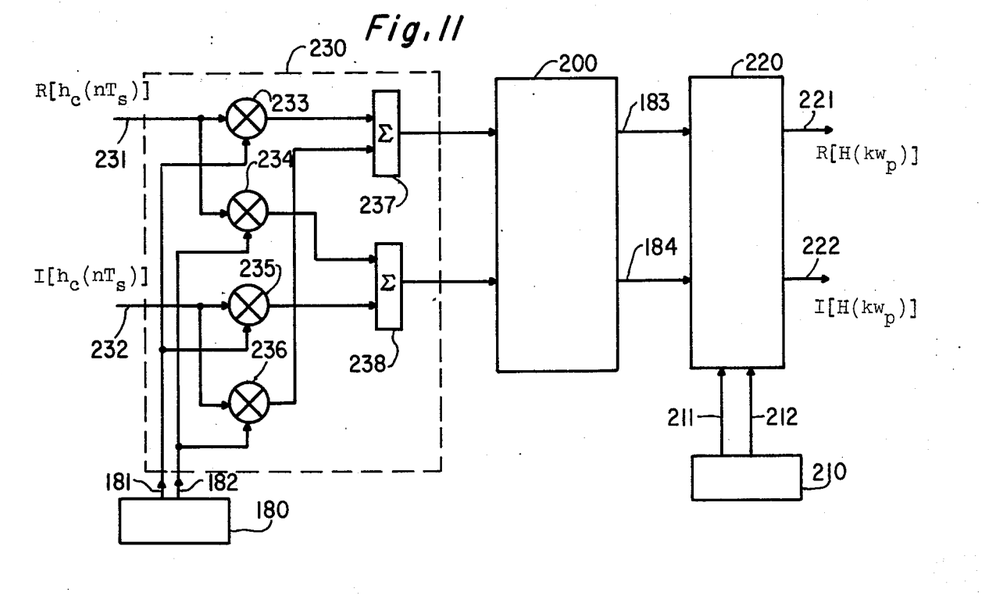
FIG. 11 is a block diagram of a complex input analog transfer function generator utilizing charge transfer devices.

FIG. 11 illustrates another embodiment of the discrete Fourier transform unit. This embodiment is capable of performing the discrete Fourier transform on complex input signals. The components indicated in FIG. 11 are the same as the components of FIG. 10, with the exception of a pre-DFT multiplier 230.

Pre-DFT multiplier 230 has four input leads. Leads 231 and 232 receive the real and imaginary components respectively of a complex input signal $h_c(nT_s)$; and leads 181 and 182 receive the pre-DFT generator signals. Two multipliers 233 and 236, and a summer 237 are included to form the real part of the complex product of the input signals. Similarly, two other multipliers 234 and 235, and another summer 238 are included to form an imaginary part of the complex product of the input signals.

Figure 12:
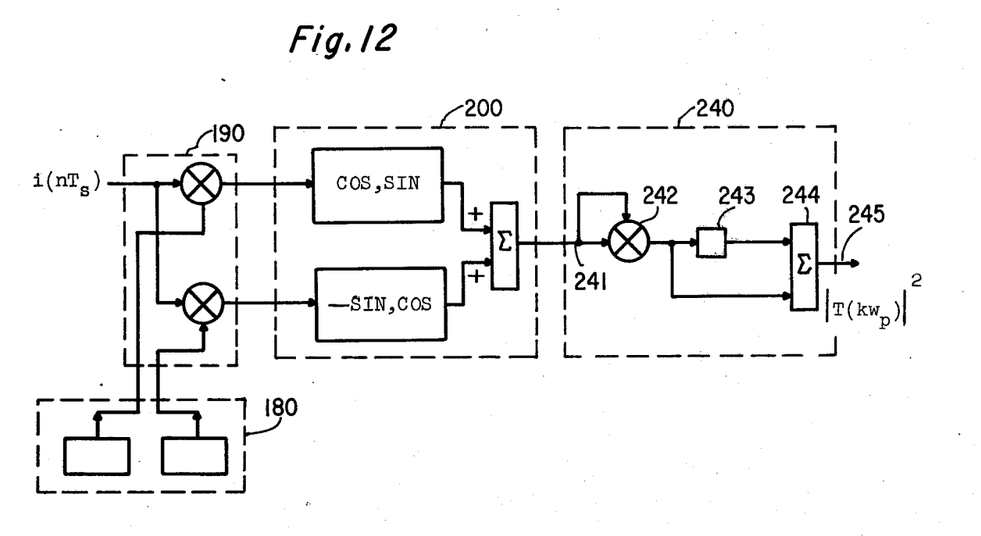
FIG. 12 is a block diagram of a device for computing the square of the magnitude of the discrete Fourier transform components.

Referring to FIG. 12, a block diagram of another aspect of the invention is illustrated. The function of this embodiment is to compute a signal $|I(kw_p)|^2$, which is the square of the magnitude of signal $I(kw_p)$. Signal $|I(kw_p)|^2$ contains useful information because it indicates the power in each component of the discrete Fourier series of input signal $i(nT_s)$.

The circuit of FIG. 12 is similar to the circuit of FIG. 10 in that it is comprised of an identical pre-DFT generator 180, an identical pre-DFT multiplier 190 and an identical DFT filter 200. The remainder of the circuit of FIG. 12 is comprised of a squaring unit 240 which is entirely different.

Within squaring unit 240, a lead 241 couples the output of the summer in DFT filter 200 to both inputs of a multiplier 242. Multiplier 242 couples to a hold circuit 243, and to a summer 244. The output of hold circuit 243 also couples to summer 244; and the output of summer 244 is made available on a lead 245. Lead 245 carries signal $|I(kw_p)|^2$.

From the above discussion, it is clear that the circuit of FIG. 12 computes $|I(kw_p)|^2$ without the use of post-DFT generator 210 and post-DFT multiplier 220 of FIG. 10. The mathematical basis for eliminating these components is as follows.

Post-DFT multiplier 220 has two output leads 221 and 222. Signal S221 on lead 221 represents the real part of $I(kw_p)$, and signal S222 on lead 222 represents the imaginary part of $I(kw_p)$. As can be seen from FIG. 10, the relation between S221 and signals S183 and S184 on leads 183 and 184 is $S221=S183[+\cos(\pi n^2/N)]+S184[\sin(\pi n^2/N)]$. Similarly, the relation between S222 and signals S183 and S184 is $S222=S183[-\sin(\pi n^2/N)]+S184[\cos(\pi n^2/N)]$. Therefore, the quantity $(S221)^2 + (S222)^2$, which clearly equals $|I(kw_p)|^2$, can be expressed in terms of S183 and S184 as $$(S183)^2(\cos\pi n^2/N)^2 + (S184)^2(\sin\pi n^2/N)^2 + \\ 2(S183)(S184)(\cos\pi n^2/N)(\sin\pi n^2/N) + \\ (S183)^2(\sin\pi n^2/N)^2 + (S184)^2(\cos\pi n^2/N)^2 - \\ 2(S183)(S184)(\cos\pi n^2/N)(\sin\pi n^2/N).$$

In the above expression, the third and last terms cancel, the first and fourth terms combine to equal $(S183)^2$, and the second and fifth terms combine to equal $(S184)^2$. Therefore, the quantity $(S221)^2 + (S222)^2$ is identical to the quantity $(S183)^2 + (S184)^2$; and the latter is what the circuit of FIG. 11 computes.

Various embodiments of the invention have now been described in detail. In view of this description, several modifications of these embodiments will quickly become apparent to those skilled in the art. For example, the "+" or "−" signs associated with the element can be reversed if the sign associated with another interconnected element is also reversed. For this reason, the claims define the sign of an impulse response of a device as "±". In addition, although most of the description is written in terms of CCD devices, it is obvious that the invention could also be implemented with other CTD devices. Since it is obvious that many changes and modifications can be made to the above details without departing from the nature and spirit of the invention, it is understood that the invention is not limited to said details except as set forth in the appended claims.

What is claimed is:

1. A programmable convolver comprising:
   a. signal transform means utilizing charge transfer devices for performing chirp Z transforms without post multiplication, on successive samples of selected segments of electronic input signals; and having inputs for receiving said successive samples, and having a pair of output electrodes for transmitting a pair of electronic signals having magnitudes equal to the real and imaginary components of said modified chirp Z transform of said successive samples,
   b. multiplier means having a first pair of inputs coupled to said output electrodes of said signal transform means, and having a second pair of inputs for receiving electronic signals having magnitudes equal to the real and imaginary components of an artibrary complex signal $H(kw_p)$; for producing a pair of product signals, on a pair of output electrodes, having magnitudes equal to the real and imaginary components of the complex product of the signals on said first and second pair of input electrodes, and
   c. inverse signal transform means having inputs coupled to said output electrodes of said multiplier means; and utilizing charge transfer devices to perform inverse chirp Z transforms without premultiplication on said pair of product signals; and having output electrodes for transmitting electronic signals with magnitudes equal to said modified inverse chirp Z transform of said product signals.

2. A programmable convolver according to claim 1 wherein:
   a. said signal transform means is comprised of a first product means having one set of inputs coupled to a first generator means and having another set of inputs coupled to said inputs of said signal transform means, and having outputs coupled to the inputs of a first filter means, and
   b. said inverse signal transform means is comprised of a second product means having one set of inputs coupled to a second generator means, and having another set of inputs coupled to the outputs of a second filter means, and having outputs coupled to said output electrodes of said inverse transform means.

3. A device according to claim 1, wherein said first and second generator means and said first and second filter means are comprised of charge transfer devices, each of said charge transfer devices having multiple output taps which are arranged to form a transversal filter.

4. A device according to claim 3, wherein said first generator means is comprised of a transversal filter having an impulse response of $\pm\cos(\pi n^2/N)$, and a transversal filter having an impulse response of $+\sin(\pi n^2/N)$.

5. A device according to claim 3, wherein said first filter means is comprised of two transversal filters each having an impulse response of $\pm\cos(\pi n^2/N)$, and two other transversal filters each having an impulse response of $\pm\sin(\pi n^2/N)$.

6. A device according to claim 3, wherein said second filter means is comprised of two transversal filters each having an impulse response of $\pm\cos(\pi n^2/N)$, and two other transversal filters each having an impulse response of $\pm\sin(\pi n^2/N)$.

7. A device according to claim 3, wherein said second generator means is comprised of a transversal filter having an impulse response to $\pm\cos(\pi n^2/N)$, and a transversal filter having an impulse response of $\pm\sin(\pi n^2 N)$.

8. A device according to claim 3, wherein said first filter means is comprised of first and second dual impulse response convolvers.

9. A device according to claim 8, wherein said first dual impulse response convolver has sequential impulse responses of $\pm\cos(\pi n^2/N)$ and $\pm\sin(\pi n^2/N)$; and said second sequential convolver has sequential impulse responses of $\pm\sin(\pi n^2/N)$ and $\pm\cos(\pi n^2/N)$.

10. A device according to claim 3, wherein said second filter is comprised of third and fourth dual impulse response convolvers.

11. A device according to claim 10, wherein said third dual impulse response convolver has sequential impulse responses of $\pm\cos(\pi n^2/N)$ and $\pm\sin(\pi n^2/N)$, and said fourth dual impulse response convolver has sequential impulse responses of $\pm\sin(\pi n^2/N)$ and $\pm\cos(\pi n^2/N)$.

12. A device according to claim 3, wherein said programmable convolver includes digital transfer function generator means coupled to said second multiplier for generating said arbitrary transfer function signal $H(kw_p)$.

13. A device according to claim 12, in which said digital transfer function generator means is comprised of two memories for providing in parallel the real part and the imaginary part of said arbitrary transfer function signal.

14. A device according to claim 12, in which said digital transfer function generator means is comprised of one memory for providing in series the real and imaginary parts of said arbitrary transfer function signal.

15. A device according to claim 12, in which said arbitrary transfer function signal is stored in digital read-only memory.

16. A device according to claim 12, in which said arbitrary transfer function signal is stored in digital read/write memory.

17. A device according to claim 12, in which said digital transfer function generator stores only half of the values of the transfer function and derives the other half from the stored values.

18. A device according to claim 3, wherein said programmable convolver includes an analog transfer function generator means coupled to said second multiplier for generating said arbitrary transfer function signal $H(kw_p)$.

19. A device according to claim 18, wherein said analog transfer function generator means is a discrete Fourier transform unit substantially comprised of charge transfer devices.

20. A programmable convolver comprising:
  a. first generator means for providing a pair of electronic output signals having magnitudes equal to the real and imaginary components of EXP$[-j\pi n^2/N]$,
  b. first multiplier means having inputs for receiving in parallel (1) successive samples of selected segments of electronic input signals and (2) said output signals of said first generator, for providing a first pair of product signals having magnitudes equal to the real and imaginary components of the complex product of the signals on said inputs of said first multiplier,
  c. first filter means, having a pair of inputs coupled to said first multiplier for receiving said first pair of product signals, having a complex impulse response of EXP$[j\pi k^2/N]$, and utilizing charge transfer devices to produce complex convolution signals having magnitudes equal to the real and imaginary components of the convolution of said first product signals and said impulse response,
  d. second multiplier means having inputs for receiving in parallel (1) said first pair of complex convolution signals, and (2) the real and imaginary components of an arbitrary complex signal H($kw_p$), for producing a second pair of product signals having magnitudes equal to the real and imaginary components of the complex product of the signals on said inputs of said second multiplier,
  e. second filter means, having inputs coupled to said second multiplier for receiving said second product signals, having a complex impulse response of EXP$[-j\pi k^2/N]$, and utilizing charge transfer devices to produce a second pair of complex convolution signals having magnitudes equal to the real and imaginary components of the convolution of said second product signals and said impulse response,
  f. second generator means for providing a pair of electronic output signals having magnitudes equal to the real and imaginary components of EXP$[+j\pi n^2/N]$, and
  g. third multiplier means, having inputs for receiving in parallel (1) said second pair of complex convolution signals, and (2) said output signals of said second generator, for producing output signals having magnitudes equal to the product of the signals on said inputs of said third multiplier.

21. A device according to claim 20, wherein said first and second generator means are comprised of charge transfer devices.

22. A device according to claim 21, wherein each of said charge transfer devices has multiple output taps which are arranged to form a transversal filter.

23. A device according to claim 22, wherein said first generator means is comprised of a transversal filter having an impulse response of $\pm\cos(\pi n^2/N)$, and a transversal filter having an impulse response of $\pm\sin(\pi n^2/N)$.

24. A device according to claim 22, wherein said first filter means is comprised of two transversal filters each having an impulse response of $\pm\cos(\pi n^2/N)$, and two transversal filters each having an impulse response of $\pm\sin(\pi n^2/N)$.

25. A device according to claim 22, wherein said second filter means is comprised of two transversal filters each having an impulse response of $\pm\cos(\pi n^2/N)$, and two CCD transversal filters each having an impulse response of $\pm\sin(\pi n^2/N)$.

26. A device according to claim 22, wherein said second generator means is comprised of a transversal filter having an impulse response of $\pm\cos(\pi n^2/N)$, and a transversal filter having an impulse response of $\pm\sin(\pi n^2/N)$.

27. A device according to claim 22, wherein said first filter means is comprised of first and second dual impulse response convolvers.

28. A device according to claim 27, wherein said first dual impulse response convolver has sequential impulse responses of $\pm\cos(\pi n^2/N)$ and $\pm\sin(\pi n^2/N)$; and said second sequential convolver has sequential impulse responses of $\pm\sin(\pi n^2/N)$ and $\pm\cos(\pi n^2/N)$.

29. A device according to claim 22, wherein said second filter is comprised of third and fourth dual impulse response convolvers.

30. A device according to claim 29, wherein said third dual impulse response convolver has sequential impulse responses of $\pm\cos(\pi n^2/N)$ and $\pm\sin(\pi n^2/N)$, and said fourth dual impulse response convolver has sequential impulse responses of $\pm\cos(\pi n^2/N)$ and $\pm\sin(\pi n^2/N$ ).

31. A device according to claim 22, wherein said programmable convolver includes digital transfer function generator means coupled to said second multiplier for generating said arbitrary transfer function signal H($kw_p$).

32. A device according to claim 31, in which said digital transfer function generator means is comprised of two memories for providing in parallel the real part and the imaginary part of said arbitrary transfer function signal.

33. A device according to claim 32, in which said digital transfer function generator means is comprised of one memory for providing in series the real and imaginary parts of said arbitrary transfer function signal.

34. A device according to claim 31, in which said arbitrary transfer function signal is stored in digital read-only memory.

35. A device according to claim 31, in which said arbitrary transfer function signal is stored in digital read/write memory.

36. A device according to claim 32, in which said digital transfer function generator stores only half of the values of the transfer function and derives the other half from the stored values.

37. A device according to claim 22, wherein said programmable convolver includes an analog transfer function generator means coupled to said second multiplier for generating said arbitrary transfer function signal H($kw_p$).

38. A device according to claim 37, wherein said analog transfer function generator means is a discrete Fourier transform unit substantially comprised of charge transfer devices.

39. A device for computing the discrete Fourier transform of complex input signals, said device including:
  a. first generator means comprised of charge transfer devices for providing a pair of output signals having magnitudes equal to the real and imaginary components of EXP$[-j\pi n^2/N]$, b. first multiplier means having two inputs for receiving successive samples of the real and imaginary components of said complex input signals, two other inputs connected to receive said output signals of said first generator; for providing a first pair of product signals having magnitudes equal to the real and imaginary components of the product of the signals on said inputs of said first multiplier, c. first filter means comprised of charge transfer devices, having a complex impulse response of $EXP[j\pi k^2/N]$, having inputs connected to receive said first pair of product signals for producing a first pair of complex convolution signals having magnitudes equal to the real and imaginary components of the convolution of said first product signals and said impulse response, d. second generator means comprised of charge transfer devices for providing a pair of electronic output signals having magnitudes equal to the real and imaginary components of $EXP[-j\pi n^2/N]$, and e. second multiplier means, having inputs connected to said first filter means to receive in parallel (1) said first pair of complex convolution signals and (2) said output signals of said second generator means, for producing a pair of final output signals having magnitudes equal to the real and imaginary components of the product of the signals on said inputs of said second multiplier.

40. A device according to claim 39, wherein all of said charge transfer devices are arranged as a transversal filter.

41. A device according to claim 40, wherein said charge transfer devices of said first filter are arranged as a transversal filter having dual impulse responses.

42. A discrete Fourier transform unit comprising:

a. first generator means comprised of charge transfer devices for providing a pair of output signals having magnitudes equal to the real and imaginary components of $EXP[-j\pi n^2/N]$, b. first multiplier means having inputs for receiving in parallel (1) successive samples of selected segments of complex electronic input signals, and (2) said output signals of said first generator; for providing a first pair of product signals having magnitudes equal to the real and imaginary components of the product of the signals on said inputs of said first multiplier, c. first filter means, having inputs connected to receive said first pair of product signals, having a complex impulse response of $EXP[j\pi k^2/N]$ obtained by utilizing charge transfer devices arranged as a dual impulse transversal filter; for producing a first pair of complex convolution signals having magnitudes equal to the real and imaginary components of the convolution of said first product signals and said impulse response, d. second generator means comprised of charge transfer devices for providing a pair of electronic output signals having magnitudes equal to the real and imaginary components of $EXP[-j\pi n^2/N]$, and e. second multiplier means, having inputs connected to said first filter means to receive in parallel (1) said first pair of complex convolution signals and (2) said output signals of said second generator means, for producing a pair of final output signals having magnitudes equal to the real and imaginary components of the product of the signals on said inputs of said second multiplier.

43. A device for computing the square of the magnitude of the discrete Fourier transform of complex input signals, said device including:

a. first generator means comprised of charge transfer devices for providing a pair of output signals having magnitudes equal to the real and imaginary components of $EXP[-j\pi n^2/N]$, b. first multiplier means having two inputs for receiving successive samples of the real and imaginary components of said complex input signals, two other inputs connected to receive said output signals of said first generator; for providing a first pair of product signals having magnitudes equal to the real and imaginary components of the product of the signals on said inputs of said first multiplier, first filter means comprised of charge transfer devices having a complex impulse response of $EXP[j\pi k^2/N]$, having inputs connected to receive said first pair of product signals, for producing a first pair of complex convolution signals having magnitudes equal to the real and imaginary components of the convolution of said first product signals and said impulse response, and d. squaring circuit means, having inputs connected to receive said first pair of convolution signals, for producing a final output signal equal to the sum of the squares of the real and imaginary parts of said convolution signals.

44. A device according to claim 43, wherein all of said charge transfer devices are arranged as a transversal filter.

45. A device for computing the square of the magnitude of N components of the discrete Fourier transform of an arbitrary input signal, said device comprising:

a. first generator means comprised of charge transfer devices for providing a pair of output signals having magnitudes equal to the real and imaginary components of $EXP[-j\pi n^2/N]$, b. first multiplier means having inputs for receiving in parallel (1) successive samples of selected segments of complex electronic input signals, and (2) said output signals of said first generator, for providing a first pair of product signals having magnitudes equal to the real and imaginary components of the product of the signals on said inputs of said first multiplier, c. first filter means, having inputs connected to receive said first pair of product signals, having a complex impulse response of $EXP[j\pi k^2/N]$ obtained by utilizing charge transfer devices arranged as a dual impulse response transversal filter; for producing a first pair of complex convolution signals having magnitudes equal to the real and imaginary components of the convolution of said first product signals and said impulse response, and d. squaring circuit means, having inputs connected to receive said first pair of convolution signals, for producing a final output signal equal to the sum of the squares of the real and imaginary parts of said convolution signals.

* * * * *